(12) United States Patent
Fluegge et al.

(10) Patent No.: US 8,055,472 B2
(45) Date of Patent: Nov. 8, 2011

(54) PERFORMANCE ANALYSIS SYSTEM AND METHOD

(75) Inventors: Ronald M. Fluegge, The Colony, TX (US); Richard B. Jones, Georgetown, TX (US)

(73) Assignee: HSB Solomon Associates, LLC TX (US)

( * ) Notice: Subject to any disclaimer, the term of this patent is extended or adjusted under 35 U.S.C. 154(b) by 130 days.

(21) Appl. No.: 12/264,127

(22) Filed: Nov. 3, 2008

(65) Prior Publication Data
US 2009/0093997 A1 Apr. 9, 2009

Related U.S. Application Data

(63) Continuation of application No. 11/801,221, filed on May 9, 2007, now Pat. No. 7,447,611.

(60) Provisional application No. 60/798,924, filed on May 9, 2006.

(51) Int. Cl.
*G06Q 99/00* (2006.01)
*G06F 19/00* (2011.01)
*G06F 17/40* (2006.01)

(52) U.S. Cl. ...... 702/182; 702/189; 705/7.11; 705/7.38; 707/603

(58) Field of Classification Search ............... 702/1, 2, 702/127, 179, 180, 181, 182, 189; 705/1.1, 705/7, 10, 342, 348, 400, 7.11, 7.38; 707/600, 707/603, 899
See application file for complete search history.

(56) References Cited

U.S. PATENT DOCUMENTS

| | | | | |
|---|---|---|---|---|
| 5,339,392 A * | 8/1994 | Risberg et al. | ............... | 715/762 |
| 7,039,654 B1 * | 5/2006 | Eder | ............... | 1/1 |
| 7,233,910 B2 * | 6/2007 | Hileman et al. | ............... | 705/11 |
| 7,447,611 B2 * | 11/2008 | Fluegge et al. | ............... | 702/182 |
| 7,469,228 B2 * | 12/2008 | Bonissone et al. | ............... | 705/36 R |
| 7,536,364 B2 * | 5/2009 | Subbu et al. | ............... | 706/13 |
| 7,966,150 B2 * | 6/2011 | Smith et al. | ............... | 702/182 |
| 2005/0038667 A1 * | 2/2005 | Hileman et al. | ............... | 705/1 |
| 2005/0187848 A1 * | 8/2005 | Bonissone et al. | ............... | 705/36 |
| 2006/0247798 A1 * | 11/2006 | Subbu et al. | ............... | 700/44 |
| 2006/0259352 A1 * | 11/2006 | Hileman et al. | ............... | 705/11 |
| 2006/0271210 A1 * | 11/2006 | Subbu et al. | ............... | 700/44 |
| 2007/0109301 A1 * | 5/2007 | Smith | ............... | 345/440 |
| 2007/0265804 A1 * | 11/2007 | Fluegge et al. | ............... | 702/182 |
| 2008/0201181 A1 * | 8/2008 | Hileman et al. | ............... | 705/7 |
| 2009/0093996 A1 * | 4/2009 | Fluegge et al. | ............... | 702/182 |
| 2009/0093998 A1 * | 4/2009 | Fluegge et al. | ............... | 702/182 |

* cited by examiner

*Primary Examiner* — Edward Cosimano
(74) *Attorney, Agent, or Firm* — Greenberg Traurig, LLP

(57) ABSTRACT

A system and method is described herein that includes a software-based functionality to assess the relationship between reliability, operational, maintenance and plant betterment activities and to determine the frontier of efficient spending and other measures of performance to achieve a level of reliability that is based on data from units of similar design and performance.

42 Claims, 4 Drawing Sheets

PERFORMANCE ANALYSIS SYSTEM AND METHOD

CROSS-REFERENCE TO RELATED APPLICATIONS

This application is a continuation of U.S. patent application Ser. No. 11/801,221 filed May 9, 2007, now U.S. Pat. No. 7,447,611, which claims the benefits of U.S. Provisional Patent Application Ser. No. 60/798,924 filed May 9, 2006.

BACKGROUND OF THE INVENTION

1. Field of the Invention

The invention relates to a system and method for comparative operational performance analysis of one or more units, such as those used in industrial, power generation, pipeline, or refining facilities, using computer software, computer hardware, graphical presentation of result and statistical frontier analysis.

2. Background Summary

Negative competition requires that units perform in the most cost-effective manner consistent with their intended use. This means achieving strategic levels of realistic reliability and expenditures on a consistent basis. The cost-effective element of this relationship is the hardest to achieve. To be effective, a unit's reliability goals and expenditures must be matched with competitive expectations. Defining what constitutes competitive goals requires critical assessments and comparisons, which can best be done using statistical benchmarking techniques.

BRIEF SUMMARY OF THE INVENTION

What are the costs to maintain capacity, for example, an "available" or "reliable" kilowatt; and what are the correct, feasible and optimal targets to be set for each of the target units in this regard (i.e., cost efficiency)? The result is not a single point answer or a relationship that directly equates a given reliability level with a given expenditure. Rather, the result is a range of achievable reliability objectives and expenditure patterns containing the information needed to support unit-specific strategies. By way of example, applying the results of this methodology maybe dependent upon the design characteristics, operating objectives as well as maintenance and plant betterment activities established for each unit.

Embodiments of the present invention provide a hardware and software tool, which overcome drawbacks of existing systems by providing a system and methodology for estimating a generating unit's potential reliability and cost that enables dynamic analyses. The predictive system and methodology of this embodiment is based on an evaluation of the relationship of unit reliability with key parameters, such as unit design characteristics, operational factors, maintenance, and plant betterment activities. While the detailed embodiments described herein deal with the power generation industry, these embodiments are illustrative and exemplary only, since the present invention may be used in numerous types of facilities, including but not limited to: refining, pipeline, chemical, industrial, pharmaceutical, healthcare, agricultural, environmental, offshore energy production, and educational facilities.

An embodiment of the present invention includes a method for generating a complete frontier curve comprising the steps of: providing a dataset of user-selected data corresponding to a plurality of units, the user-selected data comprising a plurality of variables; and computing a complete frontier curve for a user-selected dataset corresponding to at least one of the plurality of variables.

Another embodiment of the present invention includes a method for generating a frontier curve comprising the steps of: providing a dataset of user-selected data corresponding to a plurality of units, the user-selected data comprising a plurality of variables; and computing a frontier curve for a user-selected dataset corresponding to at least one of the plurality of variables.

Another embodiment of the present invention includes a method for providing dynamic comparative operational performance analyses comprising the steps of: providing a dataset of user-selected data corresponding to a plurality of power generating units, the user-selected data comprising a plurality of variables, wherein plurality of variables comprises one or more of: maintenance costs, unit capacity rating, fuel cost, reserve shutdown hours, cost/megawatt-hour, criticality, and number of reheats; determining a geometric center of the dataset; determining an orientation for the dataset based on the geometric center; converting the dataset to a predetermined coordinate system based on the geometric center; categorizing data from the dataset into a plurality of hemispheres and quadrants based on the geometric center; generating frontier curves using the categorized data; determining maximum and minimum values of variables in the dataset for frontier curves; applying a statistical filter to the data from the dataset for each of the plurality of hemispheres and quadrants, generating filtered data; combining the filtered data into frontier data groups based on user inputs; computing maxima and minima for frontier curves based on the frontier data groups; optimizing data envelopment of the frontier curves based on the geometric center; computing frontier curve base data values; converting the frontier curve based on the geometric center of the dataset; displaying a user-selected portion of the frontier curve; and comparing a target unit's data with the user-selected portion of the frontier curve.

Another embodiment of the present invention includes a method for providing dynamic comparative operational performance analyses comprising the steps of: providing a dataset of user-selected data corresponding to a plurality of refining units, the user-selected data comprising a plurality of variables, wherein the plurality of variables comprises one or more of: maintenance costs, throughput, geographic location, product type, labor costs, facility availability percentage, and maximum capacity; determining a geometric center of the dataset; determining an orientation for the dataset based on the geometric center; converting the dataset to a predetermined coordinate system based on the geometric center; categorizing data from the dataset into a plurality of hemispheres and quadrants based on the geometric center; generating frontier curves using the categorized data; determining maximum and minimum values of variables in the dataset for frontier curves; applying a statistical filter to the data from the dataset for each of the plurality of hemispheres and quadrants, generating filtered data; combining the filtered data into frontier data groups based on user inputs; computing maxima and minima for frontier curves based on the frontier data groups; optimizing data envelopment of the frontier curves based on the geometric center; computing frontier curve base data values; converting the frontier curve based on the geometric center of the dataset; displaying a user-selected portion of the frontier curve; and comparing a target unit's data with the user-selected portion of the frontier curve.

Another embodiment of the present invention includes a method for providing dynamic comparative operational performance analyses comprising the steps of: providing a dataset of user-selected data corresponding to a plurality of pipeline units, the user-selected data comprising a plurality of variables, wherein the plurality of variables comprises one or more of: engine maintenance costs, throughput, compression type, turbine starts, rights-of-way costs, land leases, population density, environmental costs, total installed horsepower, number of engines, pipeline segment length, pipeline diameter, storage capacity, and fuel costs; determining a geometric center of the dataset; determining an orientation for the dataset based on the geometric center; converting the dataset to a predetermined coordinate system based on the geometric center; categorizing data from the dataset into a plurality of hemispheres and quadrants based on the geometric center; generating frontier curves using the categorized data; determining maximum and minimum values of variables in the dataset for frontier curves; applying a statistical filter to the data from the dataset for each of the plurality of hemispheres and quadrants, generating filtered data; combining the filtered data into frontier data groups based on user inputs; computing maxima and minima for frontier curves based on the frontier data groups; optimizing data envelopment of the frontier curves based on the geometric center; computing frontier curve base data values; converting the frontier curve based on the geometric center of the dataset; displaying a user-selected portion of the frontier curve; and comparing a target unit's data with the user-selected portion of the frontier curve.

Another embodiment of the present invention includes a method for providing dynamic comparative operational performance analyses comprising the steps of: providing a dataset of user-selected data corresponding to a plurality of chemical units, the user-selected data comprising a plurality of variables, wherein the plurality of variables comprises one or more of: size of reactor vessels, number of reactor vessels, usage rates for raw materials, production rates per product, storage capacity, energy usage, carbon emissions, plant availability percentage, maintenance costs, safety costs, accident rates, and automation costs; determining a geometric center of the dataset; determining an orientation for the dataset based on the geometric center; converting the dataset to a predetermined coordinate system based on the geometric center; categorizing data from the dataset into a plurality of hemispheres and quadrants based on the geometric center; generating frontier curves using the categorized data; determining maximum and minimum values of variables in the dataset for frontier curves; applying a statistical filter to the data from the dataset for each of the plurality of hemispheres and quadrants, generating filtered data; combining the filtered data into frontier data groups based on user inputs; computing maxima and minima for frontier curves based on the frontier data groups; optimizing data envelopment of the frontier curves based on the geometric center; computing frontier curve base data values; converting the frontier curve based on the geometric center of the dataset; displaying a user-selected portion of the frontier curve; and comparing a target unit's data with the user-selected portion of the frontier curve.

Another embodiment of the present invention includes a method for providing dynamic comparative operational performance analyses comprising the steps of: providing a dataset of user-selected data corresponding to a plurality of industrial units, the user-selected data comprising a plurality of variables, wherein the plurality of variables comprises one or more of: accident rate, product quality, manufacturing schedules, delivery schedules, accounts receivables, maintenance costs, gross profits, and revenue; determining a geometric center of the dataset; determining an orientation for the dataset based on the geometric center; converting the dataset to a predetermined coordinate system based on the geometric center; categorizing data from the dataset into a plurality of hemispheres and quadrants based on the geometric center; generating frontier curves using the categorized data; determining maximum and minimum values of variables in the dataset for frontier curves; applying a statistical filter to the data from the dataset for each of the plurality of hemispheres and quadrants, generating filtered data; combining the filtered data into frontier data groups based on user inputs; computing maxima and minima for frontier curves based on the frontier data groups; optimizing data envelopment of the frontier curves based on the geometric center; computing frontier curve base data values; converting the frontier curve based on the geometric center of the dataset; displaying a user-selected portion of the frontier curve; and comparing a target unit's data with the user-selected portion of the frontier curve.

Another embodiment of the present invention includes a method for providing dynamic comparative operational performance analyses comprising the steps of: providing a dataset of user-selected data corresponding to a plurality of pharmaceutical units, the user-selected data comprising a plurality of variables, wherein the plurality of variables comprises one or more of: accident rate, batch quality, number of batches, projected yields, actual yields, number of processes, dose size production, manufacturing schedules, ingredient stocks, ingredient suppliers, number of recalls, work shifts, and maintenance costs; determining a geometric center of the dataset; determining an orientation for the dataset based on the geometric center; converting the dataset to a predetermined coordinate system based on the geometric center; categorizing data from the dataset into a plurality of hemispheres and quadrants based on the geometric center; generating frontier curves using the categorized data; determining maximum and minimum values of variables in the dataset for frontier curves; applying a statistical filter to the data from the dataset for each of the plurality of hemispheres and quadrants, generating filtered data; combining the filtered data into frontier data groups based on user inputs; computing maxima and minima for frontier curves based on the frontier data groups; optimizing data envelopment of the frontier curves based on the geometric center; computing frontier curve base data values; converting the frontier curve based on the geometric center of the dataset; displaying a user-selected portion of the frontier curve; and comparing a target unit's data with the user-selected portion of the frontier curve.

Another embodiment of the present invention includes a method for providing dynamic comparative operational performance analyses comprising the steps of: providing a dataset of user-selected data corresponding to a plurality of healthcare units, the user-selected data comprising a plurality of variables, wherein the plurality of variables comprises one or more of: total cost of service per year, total expenditure on non-labor inputs, total administrative costs, cost of purchased services, number of patients treated per year by patient category, average length of patient stay, average age of patients, area of specialization, average severity of cases, relative weight of caseload, physician's average age, fraction of caseload with satisfactory outcomes, nursing staff hourly wages, hourly wage for physicians and other professional staff, hourly wage for all other staff, number of beds, number of medical doctors, registered nurses, nonregistered nurses, nurse trainees, therapists, general and other staff, occupancy rate, proportion of patients older than 65, Medicare, Medicaid, private and other patient days, percentage of doctors on staff, rate of hospital admissions per 1000 population, unionization, level of malpractice premiums, percentage of visits using lab tests or x-rays, years of physician experience, number of physicians per 1000 county population, population density, number of acute-care beds, number of long-term beds, number of emergency visits, proportion of female patients, and teaching facilities; determining a geometric center of the dataset; determining an orientation for the dataset based on the geometric center; converting the dataset to a predetermined coordinate system based on the geometric center; categorizing data from the dataset into a plurality of hemispheres and quadrants based on the geometric center; generating frontier curves using the categorized data; determining maximum and minimum values of variables in the dataset for frontier curves; applying a statistical filter to the data from the dataset for each of the plurality of hemispheres and quadrants, generating filtered data; combining the filtered data into frontier data groups based on user inputs; computing maxima and minima for frontier curves based on the frontier data groups; optimizing data envelopment of the frontier curves based on the geometric center; computing frontier curve base data values; converting the frontier curve based on the geometric center of the dataset; displaying a user-selected portion of the frontier curve; and comparing a target unit's data with the user-selected portion of the frontier curve.

Another embodiment of the present invention includes a method for providing dynamic comparative operational performance analyses comprising the steps of: providing a dataset of user-selected data corresponding to a plurality of agricultural units, the user-selected data comprising a plurality of variables, wherein the plurality of variables comprises one or more of: land area dedicated to crops, quantity produced and actually harvested by grain type, labor type, machines, types of fertilizers and nutrient contents, types of pesticides, grain types planted, seeds and seedlings, land rental rates and monthly salaries paid wage earners, types of mechanization available, stocks of tractors and harvesters, available irrigation and water resources, average temperature, average rainfall, degree days compared to a standard measure, length of growing season, altitude, latitude, country, and region; determining a geometric center of the dataset; determining an orientation for the dataset based on the geometric center; converting the dataset to a predetermined coordinate system based on the geometric center; categorizing data from the dataset into a plurality of hemispheres and quadrants based on the geometric center; generating frontier curves using the categorized data; determining maximum and minimum values of variables in the dataset for frontier curves; applying a statistical filter to the data from the dataset for each of the plurality of hemispheres and quadrants, generating filtered data; combining the filtered data into frontier data groups based on user inputs; computing maxima and minima for frontier curves based on the frontier data groups; optimizing data envelopment of the frontier curves based on the geometric center; computing frontier curve base data values; converting the frontier curve based on the geometric center of the dataset; displaying a user-selected portion of the frontier curve; and comparing a target unit's data with the user-selected portion of the frontier curve.

Another embodiment of the present invention includes a method for providing dynamic comparative operational performance analyses comprising the steps of: providing a dataset of user-selected data corresponding to a plurality of environmental units, the user-selected data comprising a plurality of variables, wherein the plurality of variables comprises one or more of: ratio of area of disturbed land to total area, total linear edge between natural land cover and human land use, ratio of average patch size to the maximum possible, proportion of endangered species to total individual species, mortality in growing stock on timberlands, ratio of actual productivity on timberlands to potential productivity, absolute value of the difference between recent stream flow and historical average, total nitrogen measured in surface waters, maximum pH in precipitation minus observed pH in precipitation, total phosphorous measured in surface waters, total toxic chemical releases to the environment (air, water, and land), proportion of area that is designated as protected, human population density, dam density, beef cattle density, mining density, productive oil and gas well density, timber harvest, road density, outdoor recreation activity measures, total farm production, mean annual temperature, spatial variation in temperature, seasonal variation in temperature, mean annual precipitation, seasonal variation in precipitation, spatial variation in precipitation, and total vegetation carbon; determining a geometric center of the dataset; determining an orientation for the dataset based on the geometric center; converting the dataset to a predetermined coordinate system based on the geometric center; categorizing data from the dataset into a plurality of hemispheres and quadrants based on the geometric center; generating frontier curves using the categorized data; determining maximum and minimum values of variables in the dataset for frontier curves; applying a statistical filter to the data from the dataset for each of the plurality of hemispheres and quadrants, generating filtered data; combining the filtered data into frontier data groups based on user inputs; computing maxima and minima for frontier curves based on the frontier data groups; optimizing data envelopment of the frontier curves based on the geometric center; computing frontier curve base data values; converting the frontier curve based on the geometric center of the dataset; displaying a user-selected portion of the frontier curve; and comparing a target unit's data with the user-selected portion of the frontier curve.

Another embodiment of the present invention includes a method for providing dynamic comparative operational performance analyses comprising the steps of: providing a dataset of user-selected data corresponding to a plurality of offshore energy production units, the user-selected data comprising a plurality of variables, wherein the plurality of variables comprises one or more of: offshore drilling costs grouped by depth intervals, operating costs for each platform, monthly oil output, monthly gas output, produced water, platform size, platform water depth, oil reserve size, gas reserve size, reservoir-level porosity, oil output, gas output, produced water output, quantity of fluid injected, number of exploration wells drilled, total drilling distance of exploration wells, total vertical distance of exploration wells, number of development wells drilled, total drilling distance of development wells, total vertical distance of development wells, number of platforms, total number of slots, total number of slots drilled, water depth, oil reserves, gas reserves, original proved oil and gas combined reserves, number of environmental regulations, environmental compliance costs, and environmental emissions; determining a geometric center of the dataset; determining an orientation for the dataset based on the geometric center; converting the dataset to a predetermined coordinate system based on the geometric center; categorizing data from the dataset into a plurality of hemispheres and quadrants based on the geometric center; generating frontier curves using the categorized data; determining maximum and minimum values of variables in the dataset for frontier curves; applying a statistical filter to the data from the dataset for each of the plurality of hemispheres and quadrants, generating filtered data; combining the filtered data into frontier data groups based on user inputs; computing maxima and minima for frontier curves based on the frontier data groups; optimizing data envelopment of the frontier curves based on the geometric center; computing frontier curve base data values;

converting the frontier curve based on the geometric center of the dataset; displaying a user-selected portion of the frontier curve; and comparing a target unit's data with the user-selected portion of the frontier curve.

Another embodiment of the present invention includes a method for providing dynamic comparative operational performance analyses comprising the steps of: providing a dataset of user-selected data corresponding to a plurality of educational units, the user-selected data comprising a plurality of variables, wherein the plurality of variables comprises one or more of: school district, state, population in district, average family income in district, average level of education of school district population, average performance on several standardized tests by grade level, number of classroom days in the school year, instructional expenditures per student, other expenditures per student, average teacher salary, average years of experience for teachers, proportion of teachers having an advanced degree, student-teacher ratio, total enrollment in school, percent of students eligible for subsidized lunches, percent minority students, percent of students classified as possessing English proficiency, number of teachers, number of teacher aides, ratio of administrative staff to teaching staff, expenditures per student for administrative and other school operations, district school taxes per student, and average administrative salary; determining a geometric center of the dataset; determining an orientation for the dataset based on the geometric center; converting the dataset to a predetermined coordinate system based on the geometric center; categorizing data from the dataset into a plurality of hemispheres and quadrants based on the geometric center; generating frontier curves using the categorized data; determining maximum and minimum values of variables in the dataset for frontier curves; applying a statistical filter to the data from the dataset for each of the plurality of hemispheres and quadrants, generating filtered data; combining the filtered data into frontier data groups based on user inputs; computing maxima and minima for frontier curves based on the frontier data groups; optimizing data envelopment of the frontier curves based on the geometric center; computing frontier curve base data values; converting the frontier curve based on the geometric center of the dataset; displaying a user-selected portion of the frontier curve; and comparing a target unit's data with the user-selected portion of the frontier curve.

Another embodiment of the present invention includes a system comprising: a server, comprising: a processor, and a storage subsystem; a database stored by the storage subsystem comprising: a plurality of data corresponding to units; and a computer program stored by the storage subsystem, when executed causes the processor to: select a dataset from the plurality of data corresponding to user selection criteria; and determine a frontier curve based on the dataset.

Another embodiment of the present invention includes a system comprising: a first server, comprising: a processor, and a first storage subsystem; a second server, comprising: a second storage subsystem; a database stored by the second storage subsystem comprising: a plurality of data corresponding to power generating units, wherein plurality of data comprises one or more of: maintenance costs, unit capacity rating, fuel cost, reserve shutdown hours, cost/megawatt-hour, criticality, and number of reheats; and a computer program stored by the first storage subsystem that, when executed, causes the processor to: select a dataset from the plurality of data corresponding to a user selection; determine a frontier curve based on the dataset; and compare data of a target unit with a portion of the frontier curve.

Another embodiment of the present invention includes a system comprising: a first server, comprising: a processor, and a first storage subsystem; a second server, comprising: a second storage subsystem; a database stored by the second storage subsystem comprising: a plurality of data corresponding to refining units; and a computer program stored by the first storage subsystem that, when executed, causes the processor to: select a dataset from the plurality of data corresponding to a user selection, wherein the plurality of data comprises one or more of: maintenance costs, throughput, geographic location, product type, labor costs, facility availability percentage, and maximum capacity; determine a frontier curve based on the dataset; and compare data of a target unit with a portion of the frontier curve.

Another embodiment of the present invention includes a system comprising: a first server, comprising: a processor, and a first storage subsystem; a second server, comprising: a second storage subsystem; a database stored by the second storage subsystem comprising: a plurality of data corresponding to pipeline units; and a computer program stored by the first storage subsystem that, when executed, causes the processor to: select a dataset from the plurality of data corresponding to a user selection, wherein the plurality of data comprises one or more of: engine maintenance costs, throughput, compression type, turbine starts, rights-of-way costs, land leases, population density, environmental costs, total installed horsepower, number of engines, pipeline segment length, pipeline diameter, storage capacity, and fuel costs; determine a frontier curve based on the dataset; and compare data of a target unit with a portion of the frontier curve.

Another embodiment of the present invention includes a system comprising: a first server, comprising: a processor, and a first storage subsystem; a second server, comprising: a second storage subsystem; a database stored by the second storage subsystem comprising: a plurality of data corresponding to chemical units; and a computer program stored by the first storage subsystem that, when executed, causes the processor to: select a dataset from the plurality of data corresponding to a user selection, wherein the plurality of data comprises one or more of: size of reactor vessels, number of reactor vessels, usage rates for raw materials, production rates per product, storage capacity, energy usage, carbon emissions, plant availability percentage, maintenance costs, safety costs, accident rates, and automation costs; determine a frontier curve based on the dataset; and compare data of a target unit with a portion of the frontier curve.

Another embodiment of the present invention includes a system comprising: a first server, comprising: a processor, and a first storage subsystem; a second server, comprising: a second storage subsystem; a database stored by the second storage subsystem comprising: a plurality of data corresponding to industrial units; and a computer program stored by the first storage subsystem that, when executed, causes the processor to: select a dataset from the plurality of data corresponding to a user selection, wherein the plurality of data comprises one or more of: accident rate, product quality, manufacturing schedules, delivery schedules, accounts receivables, maintenance costs, gross profits, and revenue; determine a frontier curve based on the dataset; and compare data of a target unit with a portion of the frontier curve.

Another embodiment of the present invention includes a system comprising: a first server, comprising: a processor, and a first storage subsystem; a second server, comprising: a second storage subsystem; a database stored by the second storage subsystem comprising: a plurality of data corresponding to pharmaceutical units; and a computer program stored by the first storage subsystem that, when executed, causes the processor to: select a dataset from the plurality of data corresponding to a user selection, wherein the plurality of data comprises one or more of: accident rate, batch quality, number of batches, projected yields, actual yields, number of processes, dose size production, manufacturing schedules, ingredient stocks, ingredient suppliers, number of recalls, work shifts, and maintenance costs; determine a frontier curve based on the dataset; and compare data of a target unit with a portion of the frontier curve.

Another embodiment of the present invention includes a system comprising: a first server, comprising: a processor, and a first storage subsystem; a second server, comprising: a second storage subsystem; a database stored by the second storage subsystem comprising: a plurality of data corresponding to healthcare units; and a computer program stored by the first storage subsystem that, when executed, causes the processor to: select a dataset from the plurality of data corresponding to a user selection, wherein the plurality of data comprises one or more of: total cost of service per year, total expenditure on non-labor inputs, total administrative costs, cost of purchased services, number of patients treated per year by patient category, average length of patient stay, average age of patients, area of specialization, average severity of cases, relative weight of caseload, physician's average age, fraction of caseload with satisfactory outcomes, nursing staff hourly wages, hourly wage for physicians and other professional staff, hourly wage for all other staff, number of beds, number of medical doctors, registered nurses, nonregistered nurses, nurse trainees, therapists, general and other staff, occupancy rate, proportion of patients older than 65, Medicare, Medicaid, private and other patient days, percentage of doctors on staff, rate of hospital admissions per 1000 population, unionization, level of malpractice premiums, percentage of visits using lab tests or x-rays, years of physician experience, number of physicians per 1000 county population, population density, number of acute-care beds, number of long-term beds, number of emergency visits, proportion of female patients, and teaching facilities; determine a frontier curve based on the dataset; and compare data of a target unit with a portion of the frontier curve.

Another embodiment of the present invention includes a system comprising: a first server, comprising: a processor, and a first storage subsystem; a second server, comprising: a second storage subsystem; a database stored by the second storage subsystem comprising: a plurality of data corresponding to agricultural units; and a computer program stored by the first storage subsystem that, when executed, causes the processor to: select a dataset from the plurality of data corresponding to a user selection, wherein the plurality of data comprises one or more of: land area dedicated to crops, quantity produced and actually harvested by grain type, labor type, machines, types of fertilizers and nutrient contents, types of pesticides, grain types planted, seeds and seedlings, land rental rates and monthly salaries paid wage earners, types of mechanization available, stocks of tractors and harvesters, available irrigation and water resources, average temperature, average rainfall, degree days compared to a standard measure, length of growing season, altitude, latitude, country, and region; determine a frontier curve based on the dataset; and compare data of a target unit with a portion of the frontier curve.

Another embodiment of the present invention includes a system comprising: a first server, comprising: a processor, and a first storage subsystem; a second server, comprising: a second storage subsystem; a database stored by the second storage subsystem comprising: a plurality of data corresponding to environmental units; and a computer program stored by the first storage subsystem that, when executed, causes the processor to: select a dataset from the plurality of data corresponding to a user selection, wherein the plurality of data comprises one or more of: ratio of area of disturbed land to total area, total linear edge between natural land cover and human land use, ratio of average patch size to the maximum possible, proportion of endangered species to total individual species, mortality in growing stock on timberlands, ratio of actual productivity on timberlands to potential productivity, absolute value of the difference between recent stream flow and historical average, total nitrogen measured in surface waters, maximum pH in precipitation minus observed pH in precipitation, total phosphorous measured in surface waters, total toxic chemical releases to the environment (air, water, and land), proportion of area that is designated as protected, human population density, dam density, beef cattle density, mining density, productive oil and gas well density, timber harvest, road density, outdoor recreation activity measures, total farm production, mean annual temperature, spatial variation in temperature, seasonal variation in temperature, mean annual precipitation, seasonal variation in precipitation, spatial variation in precipitation, and total vegetation carbon; determine a frontier curve based on the dataset; and compare data of a target unit with a portion of the frontier curve.

Another embodiment of the present invention includes a system comprising: a first server, comprising: a processor, and a first storage subsystem; a second server, comprising: a second storage subsystem; a database stored by the second storage subsystem comprising: a plurality of data corresponding to offshore energy production units; and a computer program stored by the first storage subsystem that, when executed, causes the processor to: select a dataset from the plurality of data corresponding to a user selection, wherein the plurality of data comprises one or more of: offshore drilling costs grouped by depth intervals, operating costs for each platform, monthly oil output, monthly gas output, produced water, platform size, platform water depth, oil reserve size, gas reserve size, reservoir-level porosity, oil output, gas output, produced water output, quantity of fluid injected, number of exploration wells drilled, total drilling distance of exploration wells, total vertical distance of exploration wells, number of development wells drilled, total drilling distance of development wells, total vertical distance of development wells, number of platforms, total number of slots, total number of slots drilled, water depth, oil reserves, gas reserves, original proved oil and gas combined reserves, number of environmental regulations, environmental compliance costs, and environmental emissions; determine a frontier curve based on the dataset; and compare data of a target unit with a portion of the frontier curve.

Another embodiment of the present invention includes a system comprising: a first server, comprising: a processor, and a first storage subsystem; a second server, comprising: a second storage subsystem; a database stored by the second storage subsystem comprising: a plurality of data corresponding to educational units; and a computer program stored by the first storage subsystem that, when executed, causes the processor to: select a dataset from the plurality of data corresponding to a user selection, wherein the plurality of data comprises one or more of: school district, state, population in district, average family income in district, average level of education of school district population, average performance on several standardized tests by grade level, number of classroom days in the school year, instructional expenditures per student, other expenditures per student, average teacher salary, average years of experience for teachers, proportion of teachers having an advanced degree, student-teacher ratio, total enrollment in school, percent of students eligible for subsidized lunches, percent minority students, percent of students classified as possessing English proficiency, number of teachers, number of teacher aides, ratio of administrative staff to teaching staff, expenditures per student for administrative and other school operations, district school taxes per student, and average administrative salary; determine a frontier curve based on the dataset; and compare data of a target unit with a portion of the frontier curve.

It is expressly within the scope of the disclosed and claimed present invention that one or more steps or limitations of the present invention may be performed by a third party.

Several determinations are based on the geometric center, instead of direct calculation, since the method includes the filtering of data points, and, as necessary, data points may be eliminated from a calculation if it is determined that the data points would lead to a frontier curve that did not accurately reflect the data as a whole.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF EMBODIMENTS OF THE INVENTION

Figure 1:
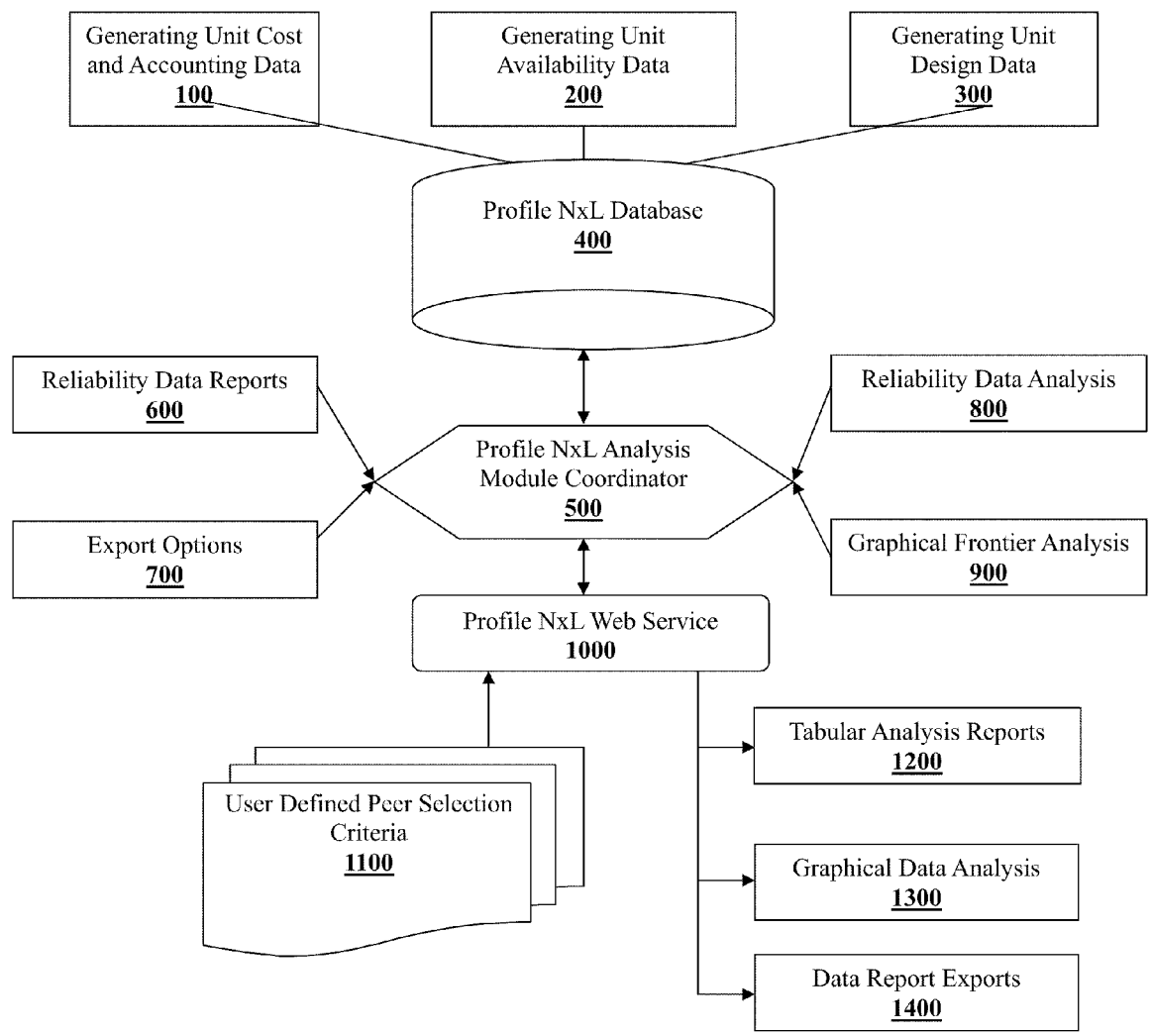
FIG. 1 is a block diagram of components for the claimed product, system, and method.

As shown in FIG. 1, the Performance Analysis System and Method according to one embodiment of the present invention is shown. While embodiments of the invention are described in terms of power generating units by way of example, the invention is not restricted to power generating facilities, but encompasses other types of facilities including, but not limited to, refining, pipeline, chemical, industrial, pharmaceutical, healthcare, agricultural, environmental, offshore energy production, and educational facilities. Operational and cost data for generating units, where the design characteristics are known at a level of granularity consistent with the analysis goals, serve as the basic input for this invention. Cost data 100 generally includes monies for operations, fuel, maintenance, and capital improvements. The data is consistent with the level of detail available in the reliability data (e.g., components, subsystems, systems and unit) and with the granularity of the reported reliability data (i.e., monthly).

The operational availability data 200 is composed of event and performance information. The event database is a detailed summary of the outage and derating events each unit had during any given period. Summarized on a monthly basis, the performance database includes capacity ratings, generation, loading modes, availability and unavailability hours, and fuel quality information for each unit.

The Generating Unit Design 300 database in this embodiment consists of details on the design parameters and installed equipment on each unit.

The integrated data is stored in a database 400. This database 400 in this embodiment serves as the primary data source for all calculations and analysis. It is accessed by an analysis controller 500 that coordinates what specific calculations are requested by a user in this embodiment.

The analysis modules in this embodiment include reliability data analysis reports 600 which list the desired reliability metrics in a user-specified format.

The export options module 700 enables users to transfer data and reports from this system to other user-specified systems for extended analyses in this embodiment.

The reliability data analysis module 800 computes user-specific summary metrics and indices including but not limited to monthly, period average, or period total unitized cost data ($ per kW or per MWh) and reliability measures for the peer-unit group that includes the target unit(s) only, the peer-unit group including the target unit(s), or the peer-unit group excluding the target unit(s).

The Graphical Frontier Analysis Module 900 enables users to review various strategies assists the decision-making process in setting realistic unit performance targets based on data from actual achieved performance by units in the comparison analysis as selected by the user.

Figure 2:
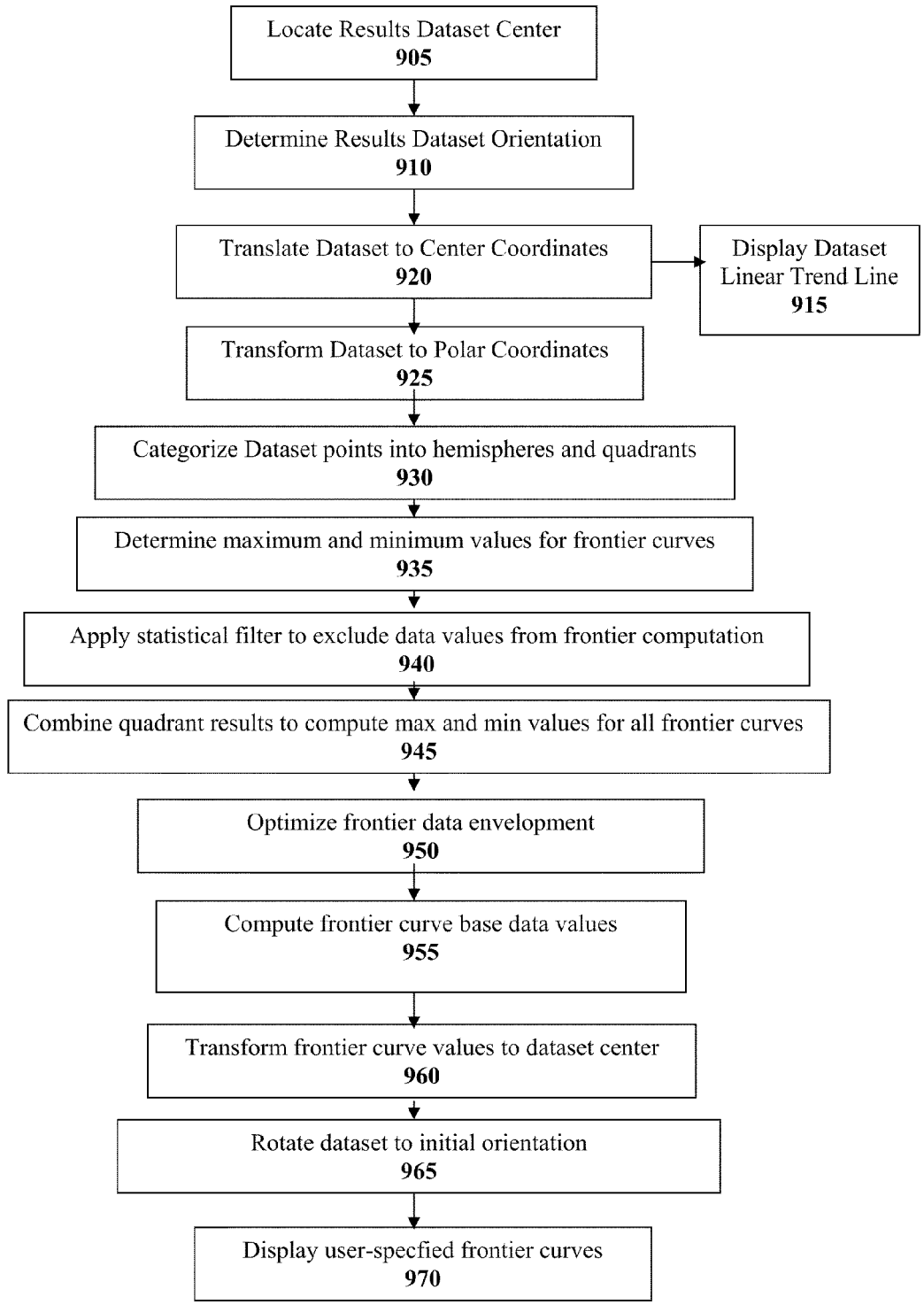
FIG. 2 is a flowchart of an embodiment of the claimed product, system, and method.

As shown in FIG. 2, a pre-selected dataset, called the results dataset, is used and its geometric center is determined in step 905. The conversion of the results dataset from its initial orientation, as determined in step 905, to polar coordinates takes place in step 920 and step 925. The use of polar coordinates is illustrative and exemplary only. The orientation of the results dataset is analyzed in step 910 and transformations are applied in step 920 and a linear trend is displayed in step 915. The results dataset is further transformed to polar coordinates in 925 and data values are categorized into hemispheres and quadrants in step 930. The methodology does not arbitrarily eliminate any generating unit that might have experienced an abnormal occurrence (data outlier); this might, in itself, bias the results. As an example, a generating unit's Equivalent Forced Outage Rate (EFOR) or expenditure pattern may be extremely high or low for one of the study periods and more reasonable at others. Excluding this high/low period would bias the analysis. Graphical data analysis allows the user to be aware of these extremes and subjective interpretations of these graphs could easily consider them. The resultant dataset's maxima and minima are computed in step 935, which provides maximum and minimum values for frontier curves. A statistical filter is applied in step 940 to determine which data values will be used in the frontier calculation. Based on user-specified inputs, the data is combined into frontier groups and new maxima and minima are calculated for composite frontier curves in step 945. The complete frontier curve is composed of the individual frontier curves (i.e. left hemisphere, right hemisphere, top hemisphere, bottom hemisphere, upper right quadrant, lower right quadrant, upper left quadrant, lower left quadrant) for a variable. These complete frontier curves are further refined to contain the maximum data envelopment in step 950. The frontier data groups are used to compute nonlinear complete frontier curves in step 955. The complete frontier curves are converted back to their original orientation in step 960 and step 965. The complete frontier curves are then transformed to the results dataset center in step 960, re-rotated to initial orientation in step 965, and displayed in graphical format superimposed on the detailed results dataset plot in step 970. The order of the foregoing steps in this embodiment is illustrative and exemplary, and the method may be practiced with the steps in a different order and may be performed using individual frontier curves.

The interface between users world-wide is managed by the Profile N×L web service in 1000. This interface performs functions related to data security and information management between the database and the family of independent users.

User selected target units to be benchmarked 1100 and the peer-unit group that has similar design characteristics and operational parameters of the target unit to the experience data contained in the database 400 are compared.

Users may select the report format and structure for which would like to view certain results 1200.

Figure 3:
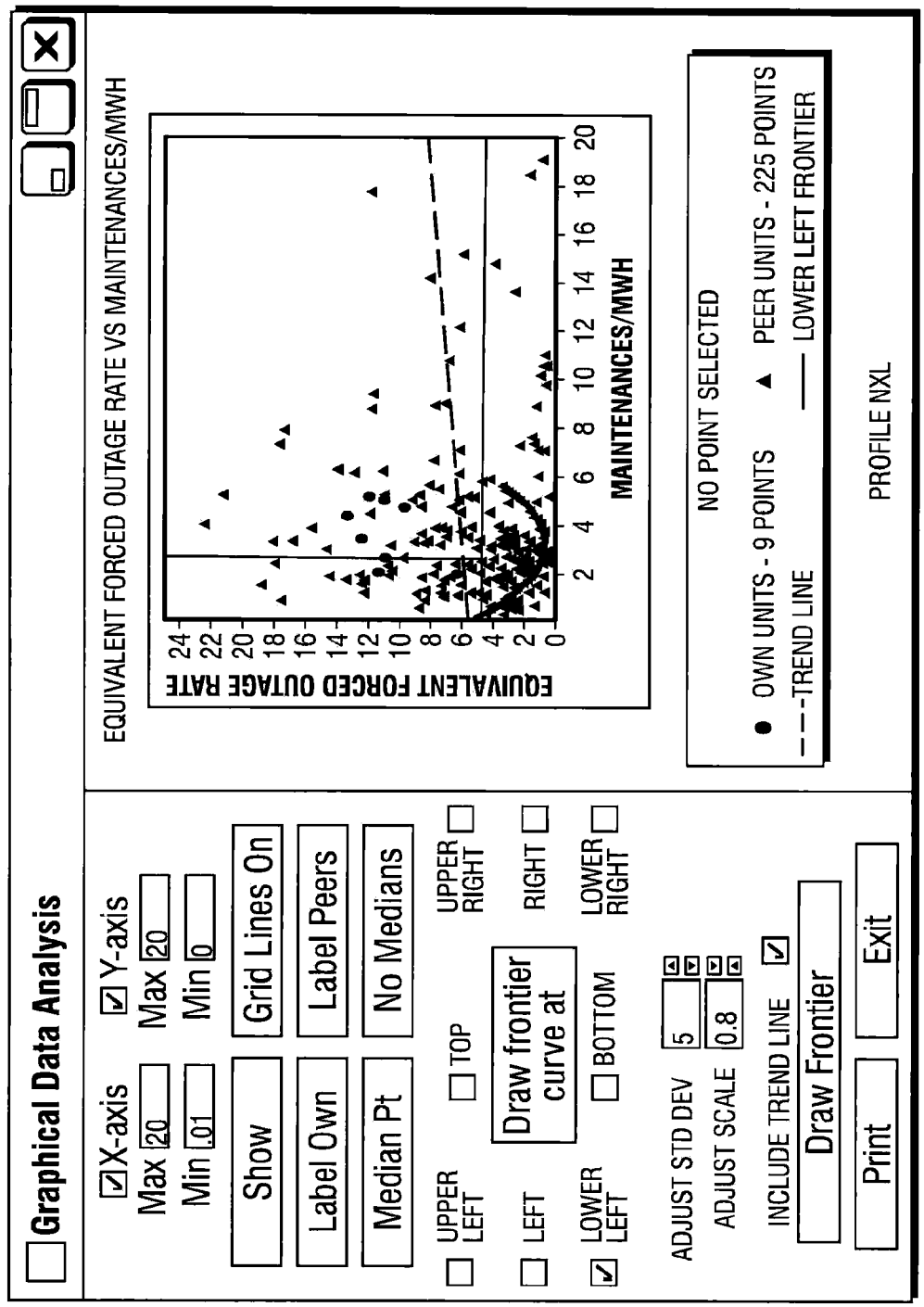
FIG. 3 is a screen shot of a frontier curve in an embodiment of the claimed product, system, and method.

The graphical output 1300 is shown in FIG. 3. It is a dynamic framework that enables users to continuously select new result sets and re-analyze and re-compare their units' performance. This integrated statistical graphical presentation is a part of the invention that enables users to re-select and thereby refine, their results set to more precisely define their performance peer group.

Figure 4:
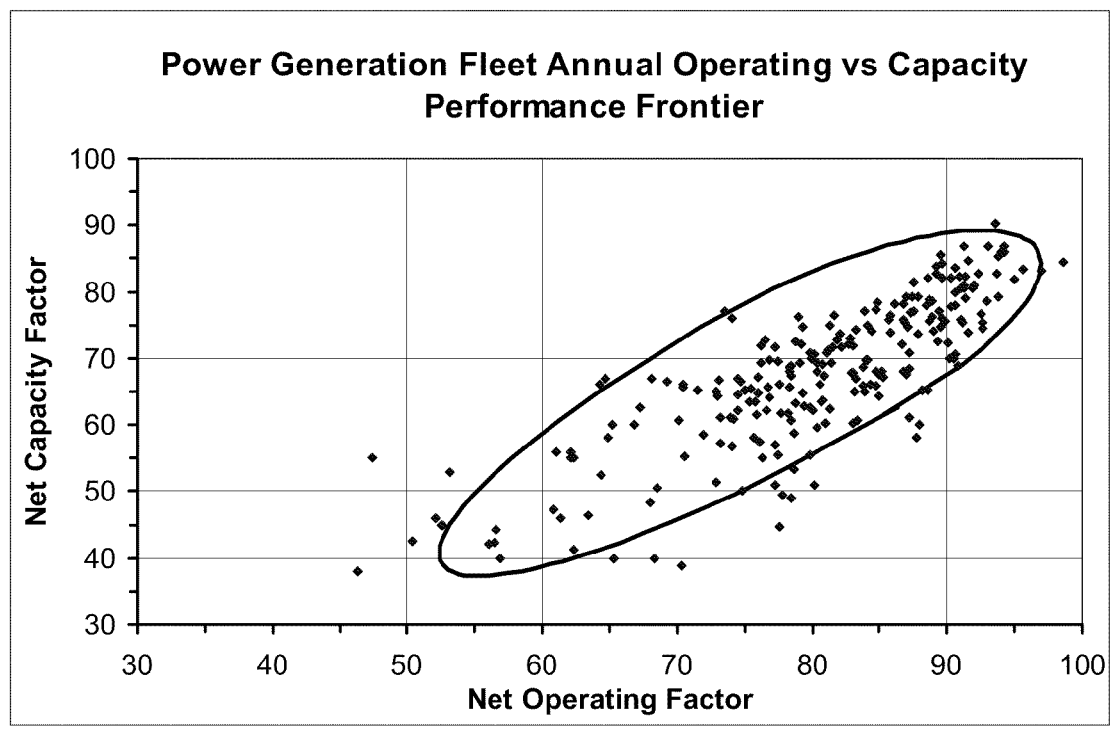
FIG. 4 is a screen shot of a complete frontier curve in an embodiment of the claimed product, system, and method.

While FIG. 3 displays an individual frontier curve as the graphical output 1300. FIG. 4 displays a complete frontier curve, wherein the complete frontier curve is formed by combining a plurality of individual frontier curves.

EXAMPLE #1

In one embodiment of the invention, the user can extract either monthly, period average, or period total unitized cost data ($ per kW or per MWh) and reliability measures for the peer-unit group that includes the target unit(s) only, the peer-unit group including the target unit(s), or the peer-unit group excluding the target unit(s). After tabulation and analysis of the resultant reliability and cost data, the user may prepare graphs showing unitized costs versus an appropriate reliability measure. The user may draw median lines for the unitized costs and reliability measure values to establish four distinct quadrants as shown in FIG. 3. The methodology in this example includes two statistical-based views of the data: (1) using the quadrant diagram, determining the trend line for the data to determine the change in the reliability measure per incremental change in unitized cost, and (2) using the quadrant diagram, performing the Frontier Analysis for the appropriate section of the data (i.e., the "best-performance" quadrant or side of the dataset) where the sections are identified as: quadrant (upper-right, upper-left, lower-right, and lower-left) or side (top, bottom, left, and right). The graphical analysis technique included in this invention in one embodiment, allows the analysis of monthly, period average, and period total values using quadrants. In this embodiment, quadrants are formed when, a horizontal line is drawn at the median of the y-axis value and a vertical line is drawn at the median of the x-axis value. The resulting "cross-hair" pattern allows the units to be divided into quadrants as in FIG. 3. Each quadrant can be seen to represent different operating and expenditure strategies. This use of medians for each axis and quadrants is illustrative and exemplary only and other lines may be used. For example, several lines may be used to on each axis to create a grid separating data points into highly specific groups. Changes in spending and operating strategies could be observed using multi-year rolling averages by reviewing graphs for several successive multi-year periods.

In FIG. 3, the quadrants created in the embodiment provide an indicator to the user of the performance of the target units compared with the dataset of units overall. In this embodiment, units with below median maintenance/$MWH and below median EFOR appear in the lower left quadrant. Units performing above the median in maintenance/$MWH and EFOR appear in the upper right quadrant. In this embodiment, a least squares fit is provided for all of the units and displayed as a dashed line. In this embodiment, frontier curves may be selected for viewing. Each frontier curve is calculated to envelope an optimal portion of the dataset while excluding extreme values (outliers). The decision of whether a point is an outlier is based on a statistical determination. In this embodiment, frontier curves may be displayed for any quadrant or to either side of either of the median lines. This display is illustrative and exemplary only.

The methodology shows that the benchmarking analysis varies with the inherent design and historical operating characteristics associated with the target unit(s). It also shows that operations and maintenance costs and plant betterment activities vary and are dependent on the strategies assigned to each generating unit. It demonstrates that given nearly any set of circumstances, changes can be made affecting generating unit reliability, costs, or both. In effect, by applying the methodology and making informed decisions, plant generation managers can set realistic, data-based performance targets.

The methodology simultaneously considers the impact of design and operational variables on the performance of an electric generating unit. The design characteristics and operational factors of the target unit(s) are the focus of this methodology. This results in the identification of a statistically valid group of units that have similar traits. Within the peer unit grouping, the units are not all the same, but they are not different enough to be different.

There are many viewpoints on which design characteristics and operation variables impact generating units. This methodology allows the user to use their own knowledge of which variables impact reliability. The benchmarking list includes two types of variables: class and continuous. Class-types include variables such as: criticality (supercritical versus subcritical), balanced versus pressurized furnace draft, number of reheats, etc. These are yes/no-type variables. Examples of continuous-type variables include: unit capacity ratings (generally between 1 and 1,200 MWe), reserve shutdown hours (generally between 0 and 8,784 hours), and unit age or vintage period based on year of installation. These are range-type variables.

The dynamic nature of this invention allows users to identify key factors influencing performance. The procedure can be applied to general unit types or tailored to a specific generating unit. The result is a more focused peer unit group against which comparisons can be made.

Users can select specific reporting metrics and analysis indices to be included in the data reports either for used within this invention or for exporting 1400 to other software for additional analyses.

EXAMPLE #2

The present invention is used to generate one or more frontier curves or a complete frontier curve to benchmark the refining industry. Refining variables may be input into the database, such as maintenance costs, throughput, geographic location, product type, labor costs, facility availability percentage, and maximum capacity.

From these variables, a frontier curve is generated determining, by way of example, cost efficiency per unit product, product per unit cost, and facility availability percentage relative to maintenance costs. Reference units, such as a reference refining unit, are constructed from the input variables and used to establish benchmarks for comparison with target refining units.

EXAMPLE #3

The present invention is used to generate one or more frontier curves or a complete frontier curve to benchmark the pipeline industry. Pipeline variables may be input into the database, such as engine maintenance costs, throughput, compression type, turbine starts, rights-of-way costs, land leases, population density, environmental costs, total installed horsepower, number of engines, pipeline segment length, pipeline diameter, storage capacity, and fuel costs.

From these variables a frontier curve is generated determining, by way of example, best usage of fuel per unit horsepower, overall performance by pipeline segment, pipeline expansion cost effectiveness, and maintenance and environmental costs dependent on population density. Reference units, such as a reference pipeline, are constructed from the input variables and used to establish benchmarks for comparison with target pipelines.

EXAMPLE #4

The present invention is used to generate one or more frontier curves or a complete frontier curve to benchmark the chemical industry. Chemical variables may be input into the database, such as size and number of reactor vessels, usage rates for raw materials, production rates per product, storage capacity, energy usage, carbon emissions, plant availability percentage, maintenance costs, safety costs, accident rates, and automation costs.

From these variables a frontier curve is generated determining, by way of example, accident rates increase/decrease with safety budget, plant availability percentage increase/decrease with automation costs, identify lowest emissions facilities, and carbon emissions increase/decrease with maintenance costs. Reference units, such as a reference chemical plant, are constructed from the input variables and used to establish benchmarks for comparison with target chemical plant.

EXAMPLE #5

The present invention is used to generate one or more frontier curves or a complete frontier curve to benchmark the industrial facilities. Industrial variables may be input into the database, such as plant safety, product quality, manufacturing schedules, delivery schedules, accounts receivables, maintenance costs, gross profits, and revenue.

From these variables a frontier curve is generated determining, by way of example, gross profit impact due to maintenance costs, revenue increase/decrease relative to product quality, and plant safety increase/decrease compared with maintenance costs. Reference units, such as a reference industrial plant, are constructed from the input variables and used to establish benchmarks for comparison with target industrial plant.

EXAMPLE #6

The present invention is used to generate one or more frontier curves or a complete frontier curve to benchmark the pharmaceutical industry. Pharmaceutical variables may be input into the database, such as plant safety, batch quality, number of batches, actual yields, number of processes, dose size production, manufacturing schedules, ingredient stocks, ingredient suppliers, recalls, work shifts, and maintenance costs.

From these variables a frontier curve is generated determining, by way of example, batch failure rate increase/decrease with ingredient suppliers, maintenance costs impact due to number of processes, and batch quality increase/decrease by work shift. The manager can decide if one shift's performance exceeds the other or that they can be judged the same. Other frontier analyses could involve for example, the highest cycle times and the lowest number of batches failed, and the lowest cycle times and the highest yields. Reference units, such as a reference pharmaceutical plant, are constructed from the input variables and used to establish benchmarks for comparison with target pharmaceutical plant.

EXAMPLE #7

The present invention is used to generate one or more frontier curves or a complete frontier curve to benchmark the healthcare industry. Healthcare variables may be input into the database, such as total cost of service per year, total expenditure on non-labor inputs, total administrative costs, cost of purchased services, number of patients treated per year by patient category, average length of patient stay, average age of patients, area of specialization, average severity of cases, relative weight of caseload, physician's average age, fraction of caseload with satisfactory outcomes, nursing staff hourly wages, hourly wage for physicians and other professional staff, hourly wage for all other staff, number of beds, number of medical doctors, registered nurses, nonregistered nurses, nurse trainees, therapists, general and other staff, occupancy rate, proportion of patients older than 65, Medicare, Medicaid, private and other patient days, percentage of doctors on staff, rate of hospital admissions per 1000 population, unionization, level of malpractice premiums, percentage of visits using lab tests or x-rays, years of physician experience, number of physicians per 1000 county population, population density, number of acute-care beds, number of long-term beds, number of emergency visits, proportion of female patients, teaching facilities, or any other variable to be analyzed.

From these variables, a frontier curve is generated determining, by way of example, for-profit hospitals more/less efficient than not-for-profit hospitals; public hospitals less/more efficient than private hospitals; facilities with larger Medicare populations and number of beds more/less efficient; unionization or excess bed capacity add significantly to hospital costs; government-controlled hospitals more/less efficient; hospitals in highly competitive, population- and physician-dense areas more/less efficient; greater expenditures on administration and nursing staff associated with higher efficiency; and are HMO type, profit status, federal eligibility and age predictive variables for efficiency. Reference units, such as a reference hospital, are constructed from the input variables and used to establish benchmarks for comparison with target hospitals or clinics.

EXAMPLE #8

The present invention is used to generate one or more frontier curves or a complete frontier curve to benchmark in the agricultural industry. Agricultural variables may be input into the database, such as land (area dedicated to crops), quantity produced and actually harvested by grain type, labor by type (household labor, permanent and temporary employees, partners and other sources of farm labor), machines, types of fertilizers and nutrient contents, types of pesticides, grain types planted, seeds and seedlings, land rental rates and monthly salaries paid wage earners, types of mechanization available, stocks of tractors and harvesters, available irrigation and water resources, average temperature, average rainfall, degree days compared to a standard measure, length of growing season, altitude, latitude, country, and region, or any other variable to be analyzed.

From these variables, a frontier curve is generated determining, by way of example, estimates of what the crop production might have been if all producers used the same levels of inputs but used them efficiently. More specifically, for example, region A could have produced 5.4% more, and region B could have boosted output by 96.5%. Can technical efficiency be explained primarily by soil and climatic conditions and irrigation? If, for example, all regional agricultural producers were to produce at the technically efficiency frontier, the nation/regional crop production could increase by more than 30%. Reference units, such as reference farms or regions, are constructed from the input variables and used to establish benchmarks for comparison with target farms or regions.

EXAMPLE #9

The present invention is used to generate one or more frontier curves or a complete frontier curve to benchmark the field of environmental protection and monitoring. The primary variables include measures of human activity and indicators of forest and rangeland conditions in place of the more traditional economic inputs (costs) and outputs such as: ratio of area of disturbed land to total area, total linear edge between natural land cover and human land use, ratio of average patch size to the maximum possible, proportion of endangered species to total individual species, mortality in growing stock on timberlands, ratio of actual productivity on timberlands to potential productivity, absolute value of the difference between recent stream flow and historical average, total nitrogen measured in surface waters, maximum pH in precipitation minus observed pH in precipitation, total phosphorous measured in surface waters, total toxic chemical releases to the environment (air, water, and land), proportion of area that is designated as protected, human population density, dam density, beef cattle density, mining density, productive oil and gas well density, timber harvest, road density, outdoor recreation activity measures, total farm production, mean annual temperature, spatial variation in temperature, seasonal variation in temperature, mean annual precipitation, seasonal variation in precipitation, spatial variation in precipitation, total vegetation carbon, or any other variable to be analyzed. These variables would be collected by country and region/county.

A frontier curve is generated determining, by way of example, areas in a country where there is maximum potential for improving the forest and rangeland condition, based on various indicator variables; what could be reasonably and realistically achievable in determining/forecasting the potential impact on forest and rangelands by increasing recreational use of these areas, expanding or reducing rangelands for cattle grazing, opening areas to drilling, and harvesting timber in national forest and grasslands. Reference units, such as reference counties or regions, are constructed from the input variables and used to establish benchmarks for comparison with target farms or regions.

EXAMPLE #10

The present invention is used to generate one or more frontier curves or a complete frontier curve to benchmarking the offshore energy production industry. The database could include offshore exploration, development, and production data such as offshore drilling costs grouped by depth intervals, operating costs for each platform, monthly oil, gas, and produced water outputs from every well in a region by year; borehole data describing drilling activity for each well; platform data such as size (i.e., slots) and water depth for each platform including substructures; field reserve data including oil and gas reserve sizes and discovery year for each field; and reservoir-level porosity information/measurements. The database could also be comprised of well-level data for oil output, gas output, produced water output, and the quantity of fluid injected, and field-level data for the number of exploration wells drilled, total drilling distance of exploration wells, total vertical distance of exploration wells, number of development wells drilled, total drilling distance of development wells, total vertical distance of development wells, number of platforms, total number of slots, total number of slots drilled, water depth, oil reserves, gas reserves, original proved oil and gas combined reserves, number of environmental regulations, environmental compliance costs, environmental emission data including water pollutants, discovery year, porosity, or any other variable to be analyzed.

The frontier curves are generated to determine, by way of example, the effect of technological change on the offshore energy production industry at the field level over time; the impact of water depth (drilling wells in deeper waters); the impact (significant or insignificant) on offshore production resulting from environmental regulation; changes in production efficiency at the field level due to depletion of reserves and resulting expansion of exploration and production in deep waters; and impacts over time due to technological change and improvement in management. Reference units, such as reference wells or platforms, are constructed from input variable and used to establish benchmarks for comparison with target wells and platforms.

EXAMPLE #11

The present invention is used to generate one or more frontier curves or a complete frontier curve to benchmark educational systems. The database could include annual data on each school: school district, state, population in district, average family income in district, average level of education of school district population, average performance on several standardized tests by grade level, number of classroom days in the school year, instructional expenditures per student, other expenditures per student, average teacher salary, average years of experience for teachers, proportion of teachers having an advanced degree, student-teacher ratio, total enrollment in school, percent of students eligible for subsidized lunches, percent minority students, percent of students classified as possessing English proficiency (e.g., English as a secondary language), number of teachers, number of teacher aides, ratio of administrative staff to teaching staff, expenditures per student for administrative and other school operations, district school taxes per student, average administrative salary, or any other variable to be analyzed.

From these variables, the frontier curve generated determines, by way of example, impact of spending on student test scores on the standardized tests; impact of reducing non-instructional and shifting to instructional spending on academic achievement for a given grade level; impediments to learning created by the environment for schools with higher percentages of disadvantaged students; effects on academic achievement due to increasing or freezing teacher salaries, increasing class sizes, or providing teachers with teaching aides; effects of district or school size on efficiency of school districts. Reference units, such as classes, schools, and colleges, are constructed from the input variables and used to establish benchmarks for comparison with target classes, schools, and colleges.

The foregoing disclosure and description of various embodiments of the invention are illustrative and explanatory thereof, and various changes in the details of the illustrated system and method may be made without departing from the scope of the invention.

We claim:

1. A method for generating an individual frontier curve comprising the steps of:
   providing a dataset of user-selected data corresponding to a plurality of units, the user-selected data comprising a plurality of variables; and
   computing an individual frontier curve for a user-selected dataset corresponding to at least one of the plurality of variables, wherein computing the individual frontier curve comprises the step of:
      converting the dataset to a predetermined coordinate system;
      filtering the dataset; and
      combining data from the dataset into a plurality of frontier groups.

2. The method of claim 1, wherein computing an individual frontier curve further comprises the step of:
   computing the individual frontier curve from the plurality of frontier groups.

3. The method of claim 1, wherein converting the dataset further comprises the steps of:
   determining an initial orientation for the dataset; and
   rotating the dataset to a predetermined orientation.

4. The method of claim 1, wherein converting the dataset comprises the step of:
   determining an initial orientation for the dataset; and
   wherein computing the individual frontier curve further comprises the step of:
      reorienting the complete frontier curve to the initial orientation.

5. The method of claim 4, wherein reorienting the individual frontier curve comprises the steps of:
   transforming the individual frontier curve to the dataset center; and
   rotating the individual frontier curve to the initial orientation.

6. A method for generating an individual frontier curve comprising the steps of:
   providing a dataset of user-selected data corresponding to a plurality of units, the user-selected data comprising a plurality of variables; and
   computing a complete frontier curve for a user-selected dataset corresponding to at least one of the plurality of variables, wherein computing an individual frontier curve further comprises the steps of:
      categorizing data from the dataset into hemispheres and quadrants;
      computing maxima and minima for the variables of the dataset;
      computing a plurality of frontier curves corresponding to the hemispheres and quadrants;
      statistically filtering the dataset;
      combining the variables into frontier groups, creating composite frontier curves;
      computing maxima and minima for the composite frontier curves; and
      combining the composite frontier curves into an individual frontier curve.

7. The method of claim 6, wherein statistically filtering the dataset comprises the step of:
   removing outlier data points.

8. A method for providing dynamic comparative operational performance analyses comprising the steps of:
   providing a dataset of user-selected data corresponding to a plurality of power generating units, the user-selected data comprising a plurality of variables,
   wherein plurality of variables comprises one or more of:
      maintenance costs, unit capacity rating, fuel cost, reserve shutdown hours, cost/megawatt-hour, criticality, and number of reheats;
   determining a geometric center of the dataset;
   determining an orientation for the dataset based on the geometric center;
   converting the dataset to a predetermined coordinate system based on the geometric center;
   categorizing data from the dataset into a plurality of hemispheres and quadrants based on the geometric center;
   generating frontier curves using the categorized data;
   determining maximum and minimum values of variables in the dataset for frontier curves;
   applying a statistical filter to the data from the dataset for each of the plurality of hemispheres and quadrants, generating filtered data;
   combining the filtered data into frontier data groups based on user inputs;
   computing maxima and minima for individual frontier curves based on the frontier data groups;
   optimizing data envelopment of the individual frontier curves based on the geometric center;
   computing individual frontier curve base data values;
   converting the individual frontier curve based on the geometric center of the dataset;
   displaying a user-selected portion of the individual frontier curve; and
   comparing a target unit's data with the user-selected portion of the individual frontier curve.

9. The method of claim 8, wherein the plurality of variables comprises one or more of unit design characteristics, operations factors, and maintenance and plant betterment data, or combinations thereof.

10. The method of claim 8 comprising the additional step of:
    displaying a linear trend of the dataset.

11. A method for providing dynamic comparative operational performance analyses comprising the steps of:
    providing a dataset of user-selected data corresponding to a plurality of refining units, the user-selected data comprising a plurality of variables, wherein the plurality of variables comprises one or more of:
       maintenance costs, throughput, geographic location, product type, labor costs, facility availability percentage, and maximum capacity;
    determining a geometric center of the dataset;
    determining an orientation for the dataset based on the geometric center;
    converting the dataset to a predetermined coordinate system based on the geometric center;
    categorizing data from the dataset into a plurality of hemispheres and quadrants based on the geometric center;
    generating frontier curves using the categorized data;
    determining maximum and minimum values of variables in the dataset for frontier curves;
    applying a statistical filter to the data from the dataset for each of the plurality of hemispheres and quadrants, generating filtered data;

combining the filtered data into frontier data groups based on user inputs;

computing maxima and minima for frontier curves based on the individual frontier data groups;

optimizing data envelopment of the individual frontier curves based on the geometric center;

computing individual frontier curve base data values;

converting the individual frontier curve based on the geometric center of the dataset;

displaying a user-selected portion of the individual frontier curve; and comparing a target unit's data with the user-selected portion of the individual frontier curve.

12. The method of claim 11, wherein the plurality of variables comprises one or more of unit design characteristics, operations factors, and maintenance and plant betterment data, or combinations thereof.

13. The method of claim 11 comprising the additional step of:

displaying a linear trend of the dataset.

14. A method for providing dynamic comparative operational performance analyses comprising the steps of:

providing a dataset of user-selected data corresponding to a plurality of pipeline units, the user-selected data comprising a plurality of variables, wherein the plurality of variables comprises one or more of:

engine maintenance costs, throughput, compression type, turbine starts, rights-of-way costs, land leases, population density, environmental costs, total installed horsepower, number of engines, pipeline segment length, pipeline diameter, storage capacity, and fuel costs;

determining a geometric center of the dataset;

determining an orientation for the dataset based on the geometric center;

converting the dataset to a predetermined coordinate system based on the geometric center;

categorizing data from the dataset into a plurality of hemispheres and quadrants based on the geometric center;

generating frontier curves using the categorized data;

determining maximum and minimum values of variables in the dataset for frontier curves;

applying a statistical filter to the data from the dataset for each of the plurality of hemispheres and quadrants, generating filtered data;

combining the filtered data into frontier data groups based on user inputs;

computing maxima and minima for individual frontier curves based on the frontier data groups;

optimizing data envelopment of the individual frontier curves based on the geometric center;

computing individual frontier curve base data values;

converting the individual frontier curve based on the geometric center of the dataset;

displaying a user-selected portion of the individual frontier curve; and comparing a target unit's data with the user-selected portion of the individual frontier curve.

15. The method of claim 14, wherein the plurality of variables comprises one or more of unit design characteristics, operations factors, and maintenance and plant betterment data, or combinations thereof.

16. The method of claim 14 comprising the additional step of:

displaying a linear trend of the dataset.

17. A method for providing dynamic comparative operational performance analyses comprising the steps of:

providing a dataset of user-selected data corresponding to a plurality of chemical units, the user-selected data comprising a plurality of variables, wherein the plurality of variables comprises one or more of:

size of reactor vessels, number of reactor vessels, usage rates for raw materials, production rates per product, storage capacity, energy usage, carbon emissions, plant availability percentage, maintenance costs, safety costs, accident rates, and automation costs;

determining a geometric center of the dataset;

determining an orientation for the dataset based on the geometric center;

converting the dataset to a predetermined coordinate system based on the geometric center;

categorizing data from the dataset into a plurality of hemispheres and quadrants based on the geometric center;

generating frontier curves using the categorized data;

determining maximum and minimum values of variables in the dataset for frontier curves;

applying a statistical filter to the data from the dataset for each of the plurality of hemispheres and quadrants, generating filtered data;

combining the filtered data into frontier data groups based on user inputs;

computing maxima and minima for individual frontier curves based on the frontier data groups;

optimizing data envelopment of the individual frontier curves based on the geometric center;

computing individual frontier curve base data values;

converting the individual frontier curve based on the geometric center of the dataset;

displaying a user-selected portion of the individual frontier curve; and comparing a target unit's data with the user-selected portion of the individual frontier curve.

18. The method of claim 17, wherein the plurality of variables comprises one or more of unit design characteristics, operations factors, and maintenance and plant betterment data, or combinations thereof.

19. The method of claim 17 comprising the additional step of displaying a linear trend of the dataset.

20. A method for providing dynamic comparative operational performance analyses comprising the steps of:

providing a dataset of user-selected data corresponding to a plurality of industrial units, the user-selected data comprising a plurality of variables, wherein the plurality of variables comprises one or more of:

accident rate, product quality, manufacturing schedules, delivery schedules, accounts receivables, maintenance costs, gross profits, and revenue;

determining a geometric center of the dataset;

determining an orientation for the dataset based on the geometric center;

converting the dataset to a predetermined coordinate system based on the geometric center;

categorizing data from the dataset into a plurality of hemispheres and quadrants based on the geometric center;

generating frontier curves using the categorized data;

determining maximum and minimum values of variables in the dataset for frontier curves;

applying a statistical filter to the data from the dataset for each of the plurality of hemispheres and quadrants, generating filtered data;

combining the filtered data into frontier data groups based on user inputs;

computing maxima and minima for individual frontier curves based on the frontier data groups;
optimizing data envelopment of the individual frontier curves based on the geometric center;
computing individual frontier curve base data values;
converting the individual frontier curve based on the geometric center of the dataset;
displaying a user-selected portion of the individual frontier curve; and
comparing a target unit's data with the user-selected portion of the individual frontier curve.

21. The method of claim 20, wherein the plurality of variables comprises one or more of unit design characteristics, operations factors, and maintenance and plant betterment data, or combinations thereof.

22. The method of claim 20 comprising the additional step of:
displaying a linear trend of the dataset.

23. A method for providing dynamic comparative operational performance analyses comprising the steps of:
providing a dataset of user-selected data corresponding to a plurality of pharmaceutical units, the user-selected data comprising a plurality of variables, wherein the plurality of variables comprises one or more of:
accident rate, batch quality, number of batches, projected yields, actual yields, number of processes, dose size production, manufacturing schedules, ingredient stocks, ingredient suppliers, number of recalls, work shifts, and maintenance costs;
determining a geometric center of the dataset;
determining an orientation for the dataset based on the geometric center;
converting the dataset to a predetermined coordinate system based on the geometric center;
categorizing data from the dataset into a plurality of hemispheres and quadrants based on the geometric center;
generating frontier curves using the categorized data;
determining maximum and minimum values of variables in the dataset for frontier curves;
applying a statistical filter to the data from the dataset for each of the plurality of hemispheres and quadrants, generating filtered data;
combining the filtered data into frontier data groups based on user inputs;
computing maxima and minima for individual frontier curves based on the frontier data groups;
optimizing data envelopment of the individual frontier curves based on the geometric center;
computing individual frontier curve base data values;
converting the individual frontier curve based on the geometric center of the dataset;
displaying a user-selected portion of the frontier curve; and
comparing a target unit's data with the user-selected portion of the individual frontier curve.

24. The method of claim 23, wherein the plurality of variables comprises one or more of unit design characteristics, operations factors, and maintenance and plant betterment data, or combinations thereof.

25. The method of claim 23 comprising the additional step of:
displaying a linear trend of the dataset.

26. A method for providing dynamic comparative operational performance analyses comprising the steps of
providing a dataset of user-selected data corresponding to a plurality of healthcare units, the user-selected data comprising a plurality of variables, wherein the plurality of variables comprises one or more of:
total cost of service per year, total expenditure on non-labor inputs, total administrative costs, cost of purchased services, number of patients treated per year by patient category, average length of patient stay, average age of patients, area of specialization, average severity of cases, relative weight of caseload, physician's average age, fraction of caseload with satisfactory outcomes, nursing staff hourly wages, hourly wage for physicians and other professional staff, hourly wage for all other staff, number of beds, number of medical doctors, registered nurses, nonregistered nurses, nurse trainees, therapists, general and other staff, occupancy rate, proportion of patients older than 65, Medicare, Medicaid, private and other patient days, percentage of doctors on staff, rate of hospital admissions per 1000 population, unionization, level of malpractice premiums, percentage of visits using lab tests or x-rays, years of physician experience, number of physicians per 1000 county population, population density, number of acute-care beds, number of long-term beds, number of emergency visits, proportion of female patients, and teaching facilities;
determining a geometric center of the dataset;
determining an orientation for the dataset based on the geometric center;
converting the dataset to a predetermined coordinate system based on the geometric center;
categorizing data from the dataset into a plurality of hemispheres and quadrants based on the geometric center;
generating frontier curves using the categorized data;
determining maximum and minimum values of variables in the dataset for frontier curves;
applying a statistical filter to the data from the dataset for each of the plurality of hemispheres and quadrants, generating filtered data;
combining the filtered data into frontier data groups based on user inputs;
computing maxima and minima for individual frontier curves based on the frontier data groups;
optimizing data envelopment of the individual frontier curves based on the geometric center;
computing individual frontier curve base data values;
converting the individual frontier curve based on the geometric center of the dataset;
displaying a user-selected portion of the frontier curve; and
comparing a target unit's data with the user-selected portion of the individual frontier curve.

27. The method of claim 26, wherein the plurality of variables comprises one or more of unit design characteristics, operations factors, and maintenance and plant betterment data, or combinations thereof.

28. The method of claim 26 comprising the additional step of:
displaying a linear trend of the dataset.

29. A method for providing dynamic comparative operational performance analyses comprising the steps of:
providing a dataset of user-selected data corresponding to a plurality of agricultural units, the user-selected data comprising a plurality of variables, wherein the plurality of variables comprises one or more of: land area dedicated to crops, quantity
produced and actually harvested by grain type, labor type, machines, types of fertilizers and nutrient contents, types of pesticides, grain types planted, seeds and seedlings, land rental rates and monthly salaries paid wage earners, types of mechanization available, stocks of tractors and harvesters, available irrigation and water resources, average temperature, average rainfall, degree days compared to a standard measure, length of growing season, altitude, latitude, country, and region;

determining a geometric center of the dataset;

determining an orientation for the dataset based on the geometric center;

converting the dataset to a predetermined coordinate system based on the geometric center;

categorizing data from the dataset into a plurality of hemispheres and quadrants based on the geometric center;

generating frontier curves using the categorized data;

determining maximum and minimum values of variables in the dataset for frontier curves;

applying a statistical filter to the data from the dataset for each of the plurality of hemispheres and quadrants, generating filtered data;

combining the filtered data into frontier data groups based on user inputs;

computing maxima and minima for individual frontier curves based on the frontier data groups;

optimizing data envelopment of the individual frontier curves based on the geometric center;

computing individual frontier curve base data values;

converting the individual frontier curve based on the geometric center of the dataset;

displaying a user-selected portion of the individual frontier curve; and comparing a target unit's data with the user-selected portion of the individual frontier curve.

30. The method of claim 29, wherein the plurality of variables comprises one or more of unit design characteristics, operations factors, and maintenance and plant betterment data, or combinations thereof.

31. The method of claim 29 comprising the additional step of:

displaying a linear trend of the dataset.

32. A method for providing dynamic comparative operational performance analyses comprising the steps of:

providing a dataset of user-selected data corresponding to a plurality of environmental units, the user-selected data comprising a plurality of variables, wherein the plurality of variables comprises one or more of ratio of area of disturbed land to total area, total linear edge between natural land cover and human land use, ratio of average patch size to the maximum possible, proportion of endangered species to total individual species, mortality in growing stock on timberlands, ratio of actual productivity on timberlands to potential productivity, absolute value of the difference between recent stream flow and historical average, total nitrogen measured in surface waters, maximum pH in precipitation minus observed pH in precipitation, total phosphorous measured in surface waters, total toxic chemical releases to the environment (air, water, and land), proportion of area that is designated as protected, human population density, dam density, beef cattle density, mining density, productive oil and gas well density, timber harvest, road density, outdoor recreation activity measures, total farm production, mean annual temperature, spatial variation in temperature, seasonal variation in temperature, mean annual precipitation, seasonal variation in precipitation, spatial variation in precipitation, and total vegetation carbon;

determining a geometric center of the dataset;

determining an orientation for the dataset based on the geometric center;

converting the dataset to a predetermined coordinate system based on the geometric center;

categorizing data from the dataset into a plurality of hemispheres and quadrants based on the geometric center;

generating frontier curves using the categorized data;

determining maximum and minimum values of variables in the dataset for frontier curves;

applying a statistical filter to the data from the dataset for each of the plurality of hemispheres and quadrants, generating filtered data;

combining the filtered data into frontier data groups based on user inputs;

computing maxima and minima for individual frontier curves based on the frontier data groups;

optimizing data envelopment of the individual frontier curves based on the geometric center;

computing individual frontier curve base data values;

converting the individual frontier curve based on the geometric center of the dataset;

displaying a user-selected portion of the individual frontier curve; and comparing a target unit's data with the user-selected portion of the individual frontier curve.

33. The method of claim 32, wherein the plurality of variables comprises one or more of unit design characteristics, operations factors, and maintenance and plant betterment data, or combinations thereof.

34. The method of claim 32 comprising the additional step of:

displaying a linear trend of the dataset.

35. A method for providing dynamic comparative operational performance analyses comprising the steps of:

providing a dataset of user-selected data corresponding to a plurality of offshore energy production units, the user-selected data comprising a plurality of variables, wherein the plurality of variables comprises one or more of:

offshore drilling costs grouped by depth intervals, operating costs for each platform, monthly oil output, monthly gas output, produced water, platform size, platform water depth, oil reserve size, gas reserve size, reservoir-level porosity, oil output, gas output, produced water output, quantity of fluid injected, number of exploration wells drilled, total drilling distance of exploration wells, total vertical distance of exploration wells, number of development wells drilled, total drilling distance of development wells, total vertical distance of development wells, number of platforms, total number of slots, total number of slots drilled, water depth, oil reserves, gas reserves, Original proved oil and gas combined reserves, number of environmental regulations, environmental compliance costs, and environmental emissions;

determining a geometric center of the dataset;

determining an orientation for the dataset based on the geometric center;

converting the dataset to a predetermined coordinate system based on the geometric center;

categorizing data from the dataset into a plurality of hemispheres and quadrants based on the geometric center;

generating frontier curves using the categorized data;

determining maximum and minimum values of variables in the dataset for frontier curves;

applying a statistical filter to the data from the dataset for each of the plurality of hemispheres and quadrants, generating filtered data;
combining the filtered data into frontier data groups based on user inputs;
computing maxima and minima for individual frontier curves based on the frontier data groups;
optimizing data envelopment of the individual frontier curves based on the geometric center;
computing individual frontier curve base data values;
converting the individual frontier curve based on the geometric center of the dataset;
displaying a user-selected portion of the individual frontier curve; and
comparing a target unit's data with the user-selected portion of the frontier curve.

36. The method of claim 35, wherein the plurality of variables comprises one or more of unit design characteristics, operations factors, and maintenance and plant betterment data, or combinations thereof.

37. The method of claim 35 comprising the additional step of displaying a linear trend of the dataset.

38. A method for providing dynamic comparative operational performance analyses comprising the steps of:
providing a dataset of user-selected data corresponding to a plurality of educational units, the user-selected data comprising a plurality of variables, wherein the plurality of variables comprises one or more of:
school district, state, population in district, average family income in district, average level of education of school district population, average performance on several standardized tests by grade level, number of classroom days in the school year, instructional expenditures per student, other expenditures per student, average teacher salary, average years of experience for teachers, proportion of teachers having an advanced degree, student-teacher ratio, total enrollment in school, percent of students eligible for subsidized lunches, percent minority students, percent of students classified as possessing English proficiency, number of teachers, number of teacher aides, ratio of administrative staff to teaching staff, expenditures per student for administrative and other school operations, district school taxes per student, and average administrative salary;
determining a geometric center of the dataset;
determining an orientation for the dataset based on the geometric center;
converting the dataset to a predetermined coordinate system based on the geometric center;
categorizing data from the dataset into a plurality of hemispheres and quadrants based on the geometric center;
generating frontier curves using the categorized data;
determining maximum and minimum values of variables in the dataset for frontier curves;
applying a statistical filter to the data from the dataset for each of the plurality of hemispheres and quadrants, generating filtered data;
combining the filtered data into frontier data groups based on user inputs;
computing maxima and minima for individual frontier curves based on the frontier data groups;
optimizing data envelopment of the individual frontier curves based on the geometric center;
computing individual frontier curve base data values;
converting the individual frontier curve based on the geometric center of the dataset;
displaying a user-selected portion of the individual frontier curve; and
comparing a target unit's data with the user-selected portion of the individual frontier curve.

39. The method of claim 38, wherein the plurality of variables comprises one or more of unit design characteristics, operations factors, and maintenance and plant betterment data, or combinations thereof.

40. The method of claim 38 comprising the additional step of:
displaying a linear trend of the dataset.

41. A method for generating an individual frontier curve comprising the steps of:
providing a dataset of user-selected data corresponding to a plurality of units, the user-selected data comprising a plurality of variables; and
computing an individual frontier curve for a user-selected dataset corresponding to at least one of the plurality of variables, wherein computing an individual frontier curve further comprises the step of:
computing maximum and minimum values for the variables of the dataset.

42. The method of claim 41, wherein computing an individual frontier curve further comprises the step of:
computing the individual frontier curve from the plurality of frontier groups.

* * * * *